United States Patent [19]
Sun et al.

[11] Patent Number: 5,799,306
[45] Date of Patent: Aug. 25, 1998

[54] METHOD AND APPARATUS FOR FACILITATING DATA REPLICATION USING OBJECT GROUPS

[75] Inventors: Harry Sun, Redwood City; Benny Souder, Belmont; Peter Lim, Redwood Shores, all of Calif.

[73] Assignee: Oracle Corporation, Redwood Shores, Calif.

[21] Appl. No.: 667,677

[22] Filed: Jun. 21, 1996

[51] Int. Cl.$^6$ .................................................. G06F 17/30
[52] U.S. Cl. .......................................... 707/10; 707/102
[58] Field of Search ............................ 395/614, 611, 395/701–10, 580, 610, 617; 364/228.1; 707/10, 102

[56] References Cited

U.S. PATENT DOCUMENTS

| | | | |
|---|---|---|---|
| 5,129,082 | 7/1992 | Tirling et al. | 395/603 |
| 5,291,583 | 3/1994 | Bapat | 395/500 |
| 5,559,991 | 9/1996 | Kanfi | 395/489 |
| 5,560,005 | 9/1996 | Hoover et al. | 395/610 |
| 5,596,744 | 1/1997 | Dao et al. | 395/610 |
| 5,615,364 | 3/1997 | Marks | 395/618 |

*Primary Examiner*—Thomas G. Black
*Assistant Examiner*—Diane D. Mizrahi
*Attorney, Agent, or Firm*—McDermott, Will & Emery

[57] ABSTRACT

A method and apparatus for replicating data in a computer system having a plurality of sites is provided. Data stored at a first site is organized as one or more sets of formatted data. A mapping is created between subsets of data within the sets of formatted data and one or more object groups. These logical mappings to object groups allow distribution of the subsets of data at a finer level of granularity than previously provided and allow the subsets of data to potentially span multiple sets of formatted data. For each of the object groups, a replica of each subset of data that is mapped to the object group is created at one or more replication sites. When a data modification is detected to a subset of data that has been mapped to one of the one or more object groups, the data modification is propagated to the corresponding replication sites.

21 Claims, 6 Drawing Sheets

METHOD AND APPARATUS FOR FACILITATING DATA REPLICATION USING OBJECT GROUPS

FIELD OF THE INVENTION

The invention relates generally to the field of database management systems. More specifically, the invention relates to data replication in a distributed database system.

BACKGROUND OF THE INVENTION

Modern data processing systems are distributed over many interconnected processing nodes (sites). The efficiency of these distributed systems depends not only upon the processing power of each independent node, but also upon the ability of the system to efficiently access the information required by the user. For example, a node can access data that resides on storage within the node (perform a "local access") much faster than it can access data stored in another node (perform a "remote access"). To take advantage of the efficiency of local access operations, some systems allow the same set of data to be maintained on multiple nodes. The mechanism for maintaining multiple copies of the same data on multiple nodes is referred to as data replication. One mechanism for performing data replication is described in U.S. patent application Ser. No. 08/479,075 entitled "Method and Apparatus for Data Replication" filed on Jun. 6, 1995 by Sandeep Jain et al. Using data replication, multiple replicas of data can exist in more than one database in a distributed system.

A "schema" can be thought of as a group of formatted, stored data. Some database management systems utilize several schemas. For example, the physical data in a database can be partitioned into several users, each user represented with a schema. In this example, a schema acts as a physical division mechanism defining boundaries between groups of physical data. Other database management systems recognize only one schema. In this type of system the physical data in the database all resides in the same schema. In either case a schema represents a physical structure of the database.

The lowest level at which replication can be performed is referred to as the unit of replication. One approach to performing data replication employs "schemas" as the unit of replication. This approach will be discussed with respect to a database management system that recognizes several schemas. By using schemas as the unit of replication, in certain circumstances this approach can replicate no less than all of the replicated objects that are members of a given schema. For example, assuming each object in a schema is required to exist at more than one node, if another node needs local copies of a subset of the objects, all the registered replicated objects in the schema must be copied to that node, even if the node does not require all the objects.

Another disadvantage of using this prior schema-level data replication is that all schemas at every site have to have the same replicated content. In other words, every replica of a given schema must contain all the member objects registered as replicated objects regardless of whether or not each node requires the replicated data modifications of all the replicated objects. These disadvantages result from tying replication to schemas as will be discussed further with respect to FIG. 1. These disadvantages arise due to the underlying assumption that all schema replicas require the same content at each site. When this underlying assumption does not hold true, a system that controls replication at the schema-level will be faced with one of two limitations: (1)

2 generation of more replication traffic than necessary, or (2) schema proliferation. Replication traffic is the amount of data that must be passed between the nodes in the distributed system to maintain the replicated data. Increased network traffic reduces the available bandwidth to perform other activities in the distributed system.

Figure 1:
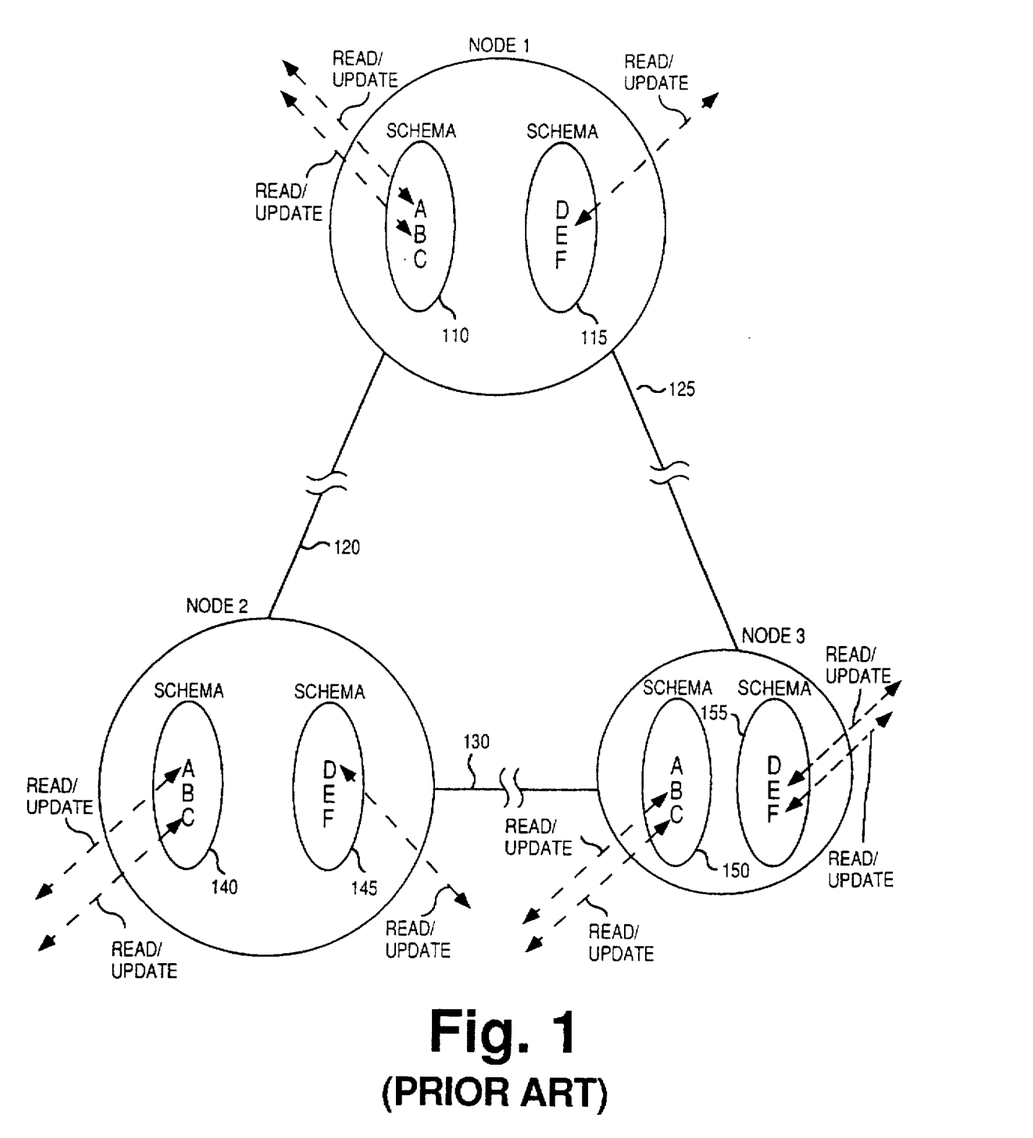
FIG. 1 is an illustration of a distributed system performing data replication using schemas as the unit of replication.

FIG. 1 illustrates a distributed processing system employing a schema-level data replication method. As illustrated by the following example, with this approach, excess replication traffic is generated when different nodes have different replication needs. Referring to FIG. 1, a distributed data processing system comprises node 1, node 2, and node 3 coupled together with network links 120, 125, and 130. A first schema 110 containing objects A, B and C is resident on node 1. Also resident on node 1 is a second schema 115 containing objects D, E and F. In this example, node 2 requires access to objects A, C and D, but does not require access to objects B, E or F. Node 3 requires access to objects B, C, E and F but does not require access to objects A or D. Dashed lines represent an operation that requires the object to be read or modified. Nodes containing replicated data are said to be participating in replication.

For node 2 to have local access to objects A and C, the data specified in the first schema 110 must be replicated on node 2. Likewise, for node 3 to have access to objects B and C, the data specified in the first schema 110 must be replicated on node 3. Upon replicating the first schema 110 to node 2 and node 3, node 2 will contain a replica 140 of the first schema 110 and node 3 will contain a replica 150 of the first schema 110. Similarly, the data specified in the second schema 115 will have to be replicated on node 2 to provide for local access to object D. Further, the data specified in the second schema 115 will have to be replicated on node 3 to provide for local access to objects E and F. Upon replicating the second schema 115 to node 2 and node 3, node 2 will contain a replica 145 of the second schema 115 and node 3 will contain a replica 155 of the second schema 115. The inefficiencies of this method become apparent when one considers node 2 will unnecessarily receive and store replicated modifications for objects B, E and F and node 3 will receive and store modifications regarding objects A and D for which it has no need. This method also has security consequences. For example, the mere presence of object B at node 2 may pose a security risk.

One solution to replication of unnecessary data modification would be to define schemas at a lower level of granularity. For example, separate schemas could be defined for objects A, B, and C (e.g., one schema would comprise only object A, another schema would comprise only object B, and another schema would comprise only object C). Breaking schemas down in this manner would solve the problem of unnecessary replication. Each node could copy only the objects to which it required access and no more. However, this approach leads to a dramatic increase in the number of schemas relative to the number of objects ("schema proliferation"). The increased number of schemas increases the complexity and burden of administering schemas for the database administrator (DBA). Schemas are typically composed of groups of data that are logically related in a way that has little to do with replication. For example, schemas can be used to impose security barriers, allowing different security levels to be assigned to individual schemas. Breaking schemas up for the purpose of replication would destroy the groupings for which the schemas were initially established.

It is, therefore, desirable to provide an apparatus and method for facilitating data replication that is independent of schemas and their related constraints. It is also desirable to allow a user to assign logical names and administer replication at an arbitrary group level that will allow users to distribute objects at a higher level of granularity than feasible with the prior schema-level data replication method.

SUMMARY OF THE INVENTION

A method and apparatus for replicating data in a computer system having a plurality of sites is disclosed. One or more sets of formatted data is stored at a first site. A mapping is created between subsets of data within the sets of formatted data and one or more object groups. One or more remote sites are specified for each of the object groups.

For each of the object groups, a replica of each subset of data that is mapped to the object group is created at the one or more specified remote sites.

When a data modification is detected to a subset of data that has been mapped to one of the one or more object groups, the data modification is propagated to the objects group's one or more remote sites.

According to one aspect of the invention, the one or more sets of formatted data stored at the first site includes a first and a second set of formatted data. The step of creating the mapping then includes creating a mapping of a first subset of data residing in the first set of formatted data to an object group and creating a mapping of a second subset of data residing in the second set of formatted data to the same object group.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4b is a portion of the flow diagram of FIG. 4a.

DETAILED DESCRIPTION OF THE PREFERRED EMBODIMENT

A method and apparatus for facilitating data replication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2:
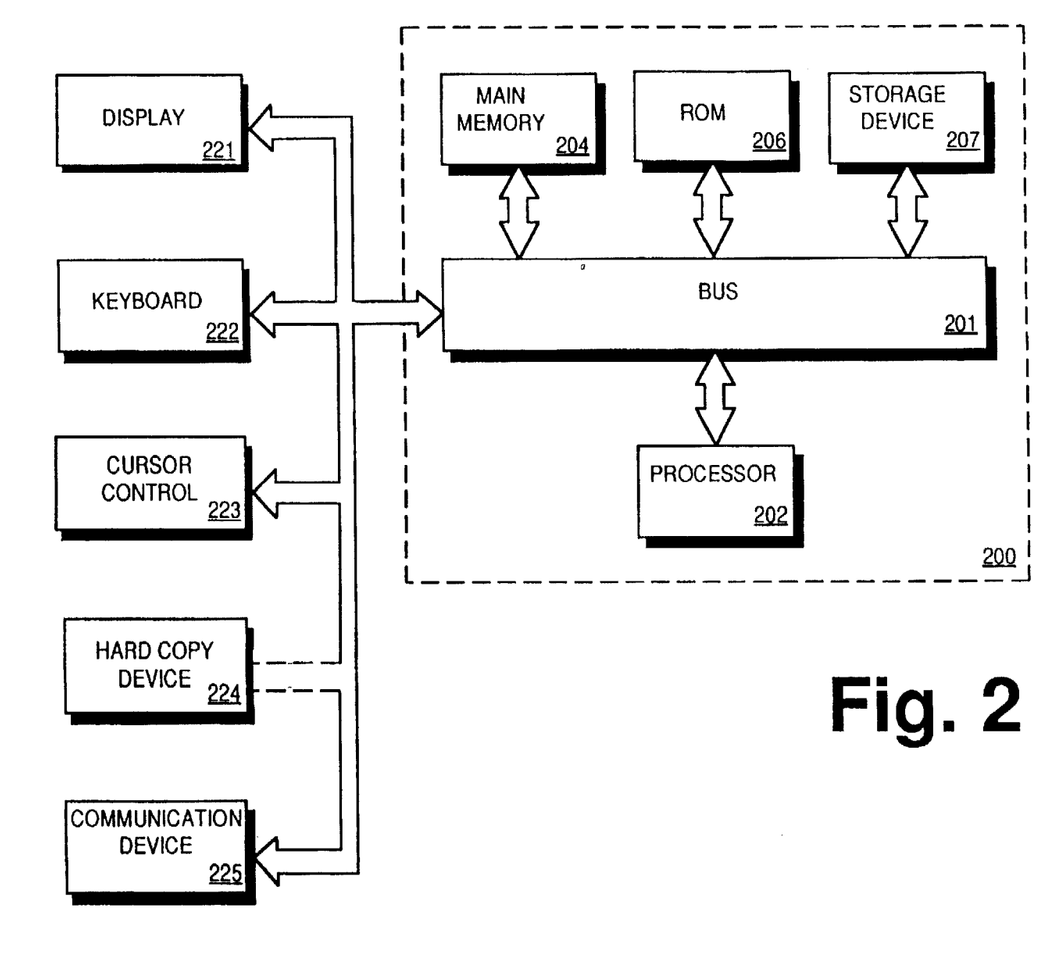
FIG. 2 is an example of a typical architecture of a node within a distributed processing system upon which one embodiment of the present invention can be implemented.

Referring to FIG. 2, a computer system is shown as 200. The computer system 200 represents a node (site) within a distributed processing system upon which the preferred embodiment of the present invention can be implemented. The hardware architecture of nodes within the distributed processing system can be varied and diverse. There is no requirement in the present invention that each node have equivalent and compatible processing systems. It is only necessary that each node of the distributed processing system be able to communicate on a network or some communication path coupling the nodes together. Computer system 200 comprises a bus or other communication means 201 for communicating information, and a processing means 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disc and its corresponding drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

Another device which may optionally be coupled to bus 201 is a hard copy device 224 which may be used for printing instructions, data or other information on a medium such as paper, film, or similar types of media.

In one embodiment, a communication device 225 is coupled to bus 201 for use in accessing other nodes of the distributed system via a network. The communication device 225 may include any of a number of commercially available networking peripheral devices such as those used for coupling to an Ethernet, token ring, Internet, or wide area network. Note that any or all of the components of the system illustrated in FIG. 2 and associated hardware may be used in various embodiments of the present invention. However, the actual system configuration used to implement the present invention may vary from implementation to implementation.

The present invention is related to the use of computer system 200 to create and maintain replicated object groups that facilitate replication of data among nodes in a computer system. As computer system 200 executes a program, it updates a data dictionary in main memory 204 to create and maintain the replicated object groups.

REPLICATED OBJECT GROUPS

A replicated object is a set of data that is copied from one site to one or more other sites in a distributed environment. Each copy of a replicated object is referred to as a replica. Any replica of a replicated object can potentially be updated, and any updates made to one replica of a replicated object are ultimately applied at all other replicas of the replicated object. An object group is a mapping between objects in one or more schemas to logical groups. A replicated object group is an object group that is a logical collection of replicated objects. Freed of the constraints related to schemas, the members of a given replicated object group can be chosen with an eye toward facilitating data replication. The replicated objects in a given replicated object group can be chosen such that they are logically related in a way that is directly associated with replication (e.g., the replicated objects share a common replication destination). Thus, replicated object groups allow a higher level mapping which provides extra flexibility in defining groups of data that will be replicated together. Advantages of using object group-level replication include allowing objects to be distributed at a higher level of granularity, and allowing distribution of collections of replicated objects that potentially span multiple schemas.

Figure 5:
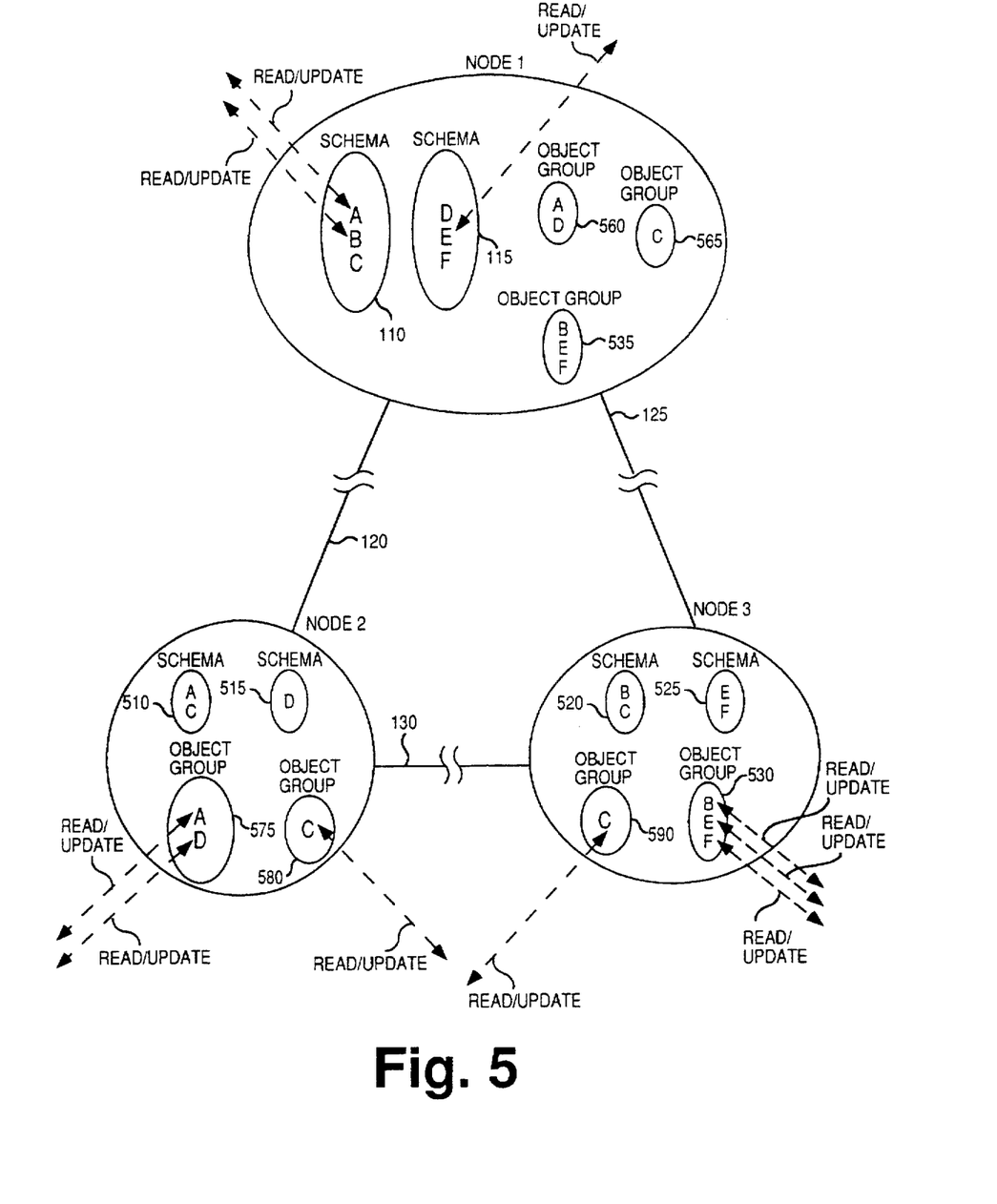
FIG. 5 is an illustration of a distributed data processing system which supports data replication according to one embodiment of the present invention.

FIG. 5 is an illustration of a distributed data processing system which supports data replication according to one embodiment of the present invention. The environment for supporting data replication is referred to as the "replication environment." A replication environment includes one or more replicated object groups, the replicated objects in the replicated object groups, and the sites containing replicas of the replicated objects. The distributed data processing system of FIG. 5 comprises node 1, node 2, and node 3 coupled together with network links 120, 125, and 130. While the system of FIG. 5 has three nodes, an arbitrary number of nodes in the distributed system may be supported in an arbitrary configuration. A first schema 110 containing objects A, B and C is resident on node 1. Also resident on node 1 is a second schema 115 containing objects D, E and F. In this example, rather than replicating data at the schema-level as in the prior approach illustrated by FIG. 1, replicated object groups 535, 560, and 565 have been intelligently chosen to facilitate data replication. The replicated object groups in this example have been chosen to minimize the inefficiencies of propagating modifications to sites that have no need for such modifications.

Like the example illustrated in FIG. 1, node 2 requires access to objects A, C and D, but does not require access to objects B, E or F. Node 3 requires access to objects B, C, E and F but does not require access to objects A and D. Again, dashed lines represent an operation that requires the object to be read or modified.

For the sake of illustration, assume that schema 110 contains payroll data (e.g., salary tables, accrued vacation tables, accrued sick time tables) and schema 115 contains accounting data (e.g., accounts payable tables, accounts receivable tables, and payroll tables). Further assume personnel department users are at node 2 and finance department users are at node 3. In this example, instead of copying all the objects contained in the first schema 110 and all the objects contained in the second schema 115 to node 2 and node 3, only the objects required at each node will be replicated.

The personnel department users at node 2 primarily rely on payroll data; however, they require some accounting data. In contrast, the finance department users primarily access accounting data and only some payroll data is required. Therefore, replicated object groups 560 and 565 will be copied to node 2 and replicated object groups 535 and 565 will be copied to node 3. Objects A and D are grouped together in replicated object group 560 because they are both required at node 2 by the personnel department users and neither are required by the finance department users at node 3. While the underlying data of objects A and D may be completely unrelated (e.g., accrued vacation and accounts receivable), the commonality is the fact that they will both be replicated to node 2 and not to node 3. Similarly objects B, E, and P are grouped together in replicated object group 535; their association based purely on the fact that they all will be replicated to node 3 and not to node 2.

Once the replicated object groups are copied, node 2 will contain a first schema 510 containing only objects A and C from schema 110, a second schema 515 containing only object D, a first replica 575 of replicated object group 560, and a second replica 580 corresponding to replicated object group 565. Further, node 3 will contain, a first schema 520 containing only objects B and C, a second schema 525 containing only objects E and F, a first replica 590 corresponding to replicated object group 565, and a second replica 530 corresponding to replicated object group 535.

These intelligent groupings illustrate the advantages of using replicated object groups for data replication. In contrast to the schema-based replication mechanisms, object group-based replication allows the various nodes to contain replicas of only those sets of data that are required by the nodes. Thus, in this example, the finance department users at node 3 will not unnecessarily receive payroll data that they do not require and the personnel department users at node 2 will not be burdened with accounting data that is not required. This decreases both the storage space required for replication, and the internode traffic generated during replication. In addition, the existing schemas are not affected or restricted by the groupings specified in the replicated object groups. This example illustrates how employing replicated object groups as the logical unit of distribution facilitates data replication.

TABLE-BASED IMPLEMENTATION OF REPLICATED OBJECT GROUPS

According to one embodiment of the invention, computer system 200 uses a plurality of tables to implement replicated object groups. This plurality of tables will be discussed in detail with respect to FIG. 3.

Figure 3:
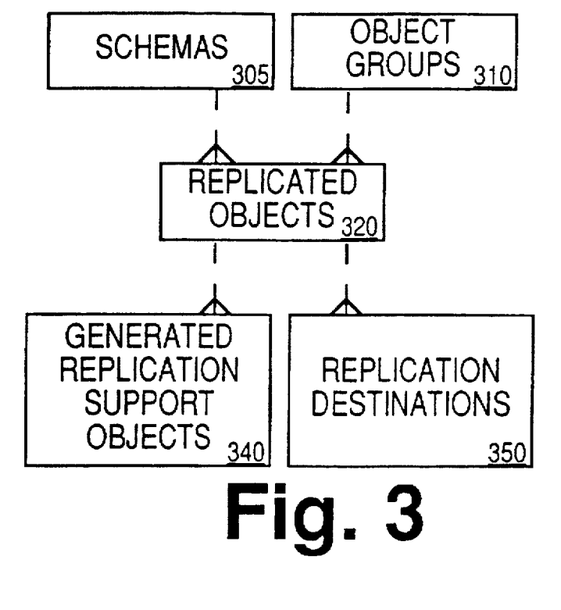
FIG. 3 is a database data dictionary design for supporting a method of specifying a replication environment and replicating data according to one embodiment of the present invention.

FIG. 3 illustrates the relationship among the database data dictionary tables for one embodiment of the present invention. In FIG. 3, one-to-many relationships are represented by the inverted V at the end of the "many" side of the one-to-many relationship.

A replicated objects table 320 is a table that contains records providing information about the objects in each replicated object group. The replicated objects table 320 lists all the members of each replicated object group. The replicated objects table 320 contains columns (attributes) indicating the characteristics and status of objects associated with each replicated object group. The columns of the replicated objects table 320 are described below in Table 1.

TABLE 1

Replicated Objects Table

| Column | Description |
| --- | --- |
| sname | The owner of the object. |
| oname | The name of the object. |
| type | The type of object (e.g. table, view, package, package body, procedure, function, index, synonym, trigger, or snapshot). |
| status | The status of the object. |
| id | An identifier associated with the local database object. |
| comment | User-defined comment for the object. |
| gname | The name of the replicated object group that contains the object. |

In one embodiment, the replicated objects table 320 includes an sname column. The sname column indicates the name of the schema that contains the replicated objects specified by oname. In this embodiment, the sname column identifies the user that owns the object. In another embodiment, the database has only one schema and the sname column becomes unnecessary. The oname column contains the name of the replicated object. The type column indicates the type of object that is to be replicated. Replicated objects can include database objects and structures such as tables, views, sequences, stored procedures, synonyms, indexes, clusters, and database links. In one embodiment, the replicated objects table 320 includes a status column. The status column indicates the status of a given replica. The status column is maintained independently at the site of each replica. Exemplary status values include the following: Create—Indicates that the local database is an attempting to create the object locally; Compare—The replica is being compared with the master definition to ensure that they are consistent; Valid—The creation or comparison has completed successfully; Error—The creation or comparison was unsuccessful. In one embodiment, the replicated objects table 320 includes an id column. The id column is a unique number that identifies the replicated object on the local node. In this embodiment, access to the object is faster and easier than accessing the object by its name (oname). The comment column allows a user supplied comment to be associated with the object. The gname column indicates the name of the replicated object group to which the object belongs. In other words, the object is a member of the replicated object group having the name indicated by the gname column. The existence of both a gname and an sname column allows a given object to be independently associated with both a schema and a replicated object group. Therefore, in an environment having multiple schemas, an advantage of this embodiment is that it allows a replicated object group to span multiple schemas. This means some of the objects in a replicated object group could be members of one schema, others could belong to a different schema, and still others might belong to a third schema. For example, in FIG. 5 replicated object group 560 contains object A from schema 110 and object D from schema 115.

In one embodiment, a replication destinations table 350 contains records providing information about the technique used to propagate data modifications and the sites to which each replicated object is replicated. The columns of the replication destinations table 350 are described below in Table 2. In this embodiment, many records in the replication destinations table 350 can be associated with a given record in the replicated objects table 320. This relationship allows changes made to a given replicated object to propagate to different sites using different propagation techniques. For example, an object might propagate changes asynchronously to one site and data modifications to the same object could potentially propagate synchronously to another site. The columns of the replication destinations table 350 indicate the technique used to propagate operations on an object to the corresponding replica at another replication site. The operations to be propagated may have resulted from a call to a stored procedure or procedure wrapper, or may have been issued against a table directly. In one embodiment, the replication sites are classified-as either snapshot sites or master sites. Master sites receive propagated changes immediately when changes are applied to any object being replicated at that site or at user-defined time-based intervals. Master sites are characterized by the fact that they can support one or more snapshot sites. A Snapshot site is refreshed from its associated master site at a time-based interval or on demand.

TABLE 2

Replication Destinations Table

| Column | Description |
| --- | --- |
| sname | The owner of the object. |
| oname | The name of the replicated object. |
| type | The type of object. |
| dblink | The fully qualified database name of the site to which changes are being propagated. |
| how | How the propagation is performed. |
| comment | User-defined comment for the object. |

The replication destinations table 350 contains an sname column, an oname column, a type column, a dblink column, a how column, and a comment column. The sname column, oname column, type column, and comment column are as described above with respect to the replicated objects table 320.

The dblink column contains the database name of a site to which data modifications will be propagated. The replication destinations table 350 will have a record corresponding to each object and each site to which the object's data modifications are propagated. For example, in FIG. 5, the replication destinations table at node 1 will have a record indicating that node 2 is a site to which changes to object C will be propagated and the table will also have a record indicating that node 3 is a site to which changes to object C will be propagated. In this example, however, since object A only replicated at node 2, the replication destinations table at node 1 will only need one record corresponding to object A.

The how column indicates the method of propagation to the site listed in the dblink column. Exemplary methods include synchronous and asynchronous. If the how column is synchronous, propagation to the dblink site is performed synchronously. When the how column is asynchronous, propagation to the dblink site is performed asynchronously. An advantage of providing the site and method of propagation to a given site at this level in the database design allows a given object to propagate changes to sites independently using different propagation techniques.

According to another embodiment of the invention, a generated replication support objects table 340 is provided. The generated replication support objects table 340 maintains a list of objects that have been generated to support replication. Since many support objects may be required for a given object, many records in the generated replication support objects table 340 can be associated with each record in the replicated objects table 320. The columns of the generated replication support objects table 304 are described below in Table 3.

TABLE 3

Generated Replication Support Objects Table

| Column | Description |
|---|---|
| sname | The owner of the generated object. |
| oname | The name of the generated object. |
| type | The type of the generated object. |
| reason | Reason for generating the object. |
| base_sname | Owner of the "parent" object. |
| base_oname | Name of the "parent" object. |
| base_type | Type of the "parent" object. |

The first four columns relate to the generated object. The sname column indicates the name of the schema that contains the generated object. The oname column contains the name of the generated object. The reason column indicates why the generated object was created. The type column indicates the type of the generated object. Generated objects include database objects and structures and can include triggers, packages, and procedures to support replication of objects. For example, in FIG. 5 a change to object A at node 1 might fire a generated trigger that calls a remote generated procedure at node 2 that applies the same change at the remote site to the replicated object A.

The generated replication support objects table 340 also includes a base_sname column, a base_oname column, and a base_type column. These "base" columns all refer to the "parent" object. The "parent" object is the object which the generated object was created to support. The base_sname column contains the name of the schema of which the "parent" object is a member. The base_oname column contains the name of the "parent" object. The base_type column indicates the "parent" object's type.

An object groups table 310 is a table that contains records providing information about all the replicated object groups that are being replicated. A one-to-many relationship exists between the replicated objects table 320 and the object groups table 310; therefore, allowing many objects to be added to (associated with) a given replicated object group. For example, in FIG. 5 replicated object group 560 contains objects A and D. In this example, the replicated objects table at node 1 contains a record for object A associating (registering) it with replicated object group 560 and a record for object D associating it with replicated object group 560. The object groups table 310 maintains a list of replicated object groups that have been created for replication. The columns of the object groups table 310 indicate the status of a given replicated object group. The columns of the object groups table 310 are described below in Table 4.

TABLE 4

Object Groups Table

| Column | Description |
|---|---|
| gname | The name of the replicated object group. |
| master | 'Y' indicates that this site is a master site. |
|  | 'N' indicates that this site is a snapshot site. |
| status | The status of the site. |
| comment | User-defined comment for the replicated object group. |

The object groups table 310 includes a gname column, a master column, a status column, and a comment column. The gname column contains the name associated with the replicated object group. The master column indicates whether the site where the object groups table 310 resides is a master site or a snapshot site. The status column is available to provide further information about the site. Finally, the comment column provides the user the option of supplying a comment regarding the associated replicated object group.

In one embodiment, a schemas table 305 is provided. The schemas table 305 is a table that contains a list of schemas in the database. A one-to-many relationship exists between the replicated objects table 320 and the schemas table 305. Thus, multiple objects can be associated with each schema listed in the schemas table 305. For example, in FIG. 5 objects A, B, and C are all associated with (members of) schema 110. In another embodiment, the schemas table 305 is unnecessary because the database is the schema; therefore, only one schema would exist and all replicated objects would be associated with this schema. The columns of the schemas table 305 are described below in Table 5.

TABLE 5

Schemas Table

| Column | Description |
|---|---|
| username | The name of the user. |
| user_id | Unique number that identifies the user. |
| password | Encrypted password. |
| created | Date of creation. |

The schemas table 305 includes a username column, an optional user_id column, an optional password column, and an optional created column. The username column indicates the name of the user. The user_id column is not required, but may be provided for easier access to the user rather than accessing it by the username. The password column contains a password for the associated user. The date of creation may also be associated with the user by providing a created column.

While FIG. 3 has been described with reference to tables, various alternative mechanisms may be used to represent the data dictionary entities. For example, an alternative approach in an object-oriented database would be to represent the entities 305, 310, 320, 340, and 350 as objects.

Figure 4A:
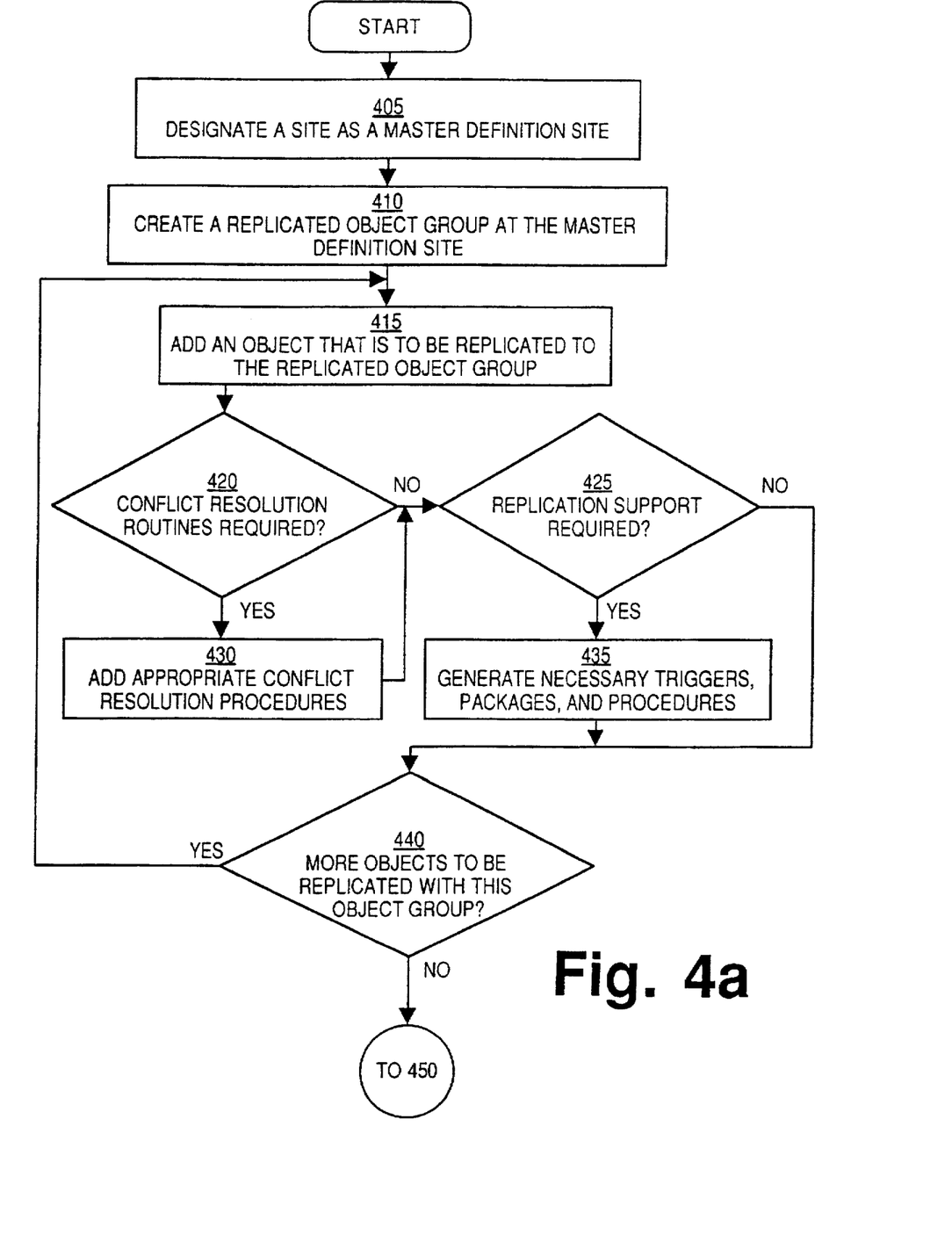
FIG. 4a is a flow diagram illustrating a method of specifying a replication environment and replicating data according to one embodiment of the present invention.
Figure 4B:
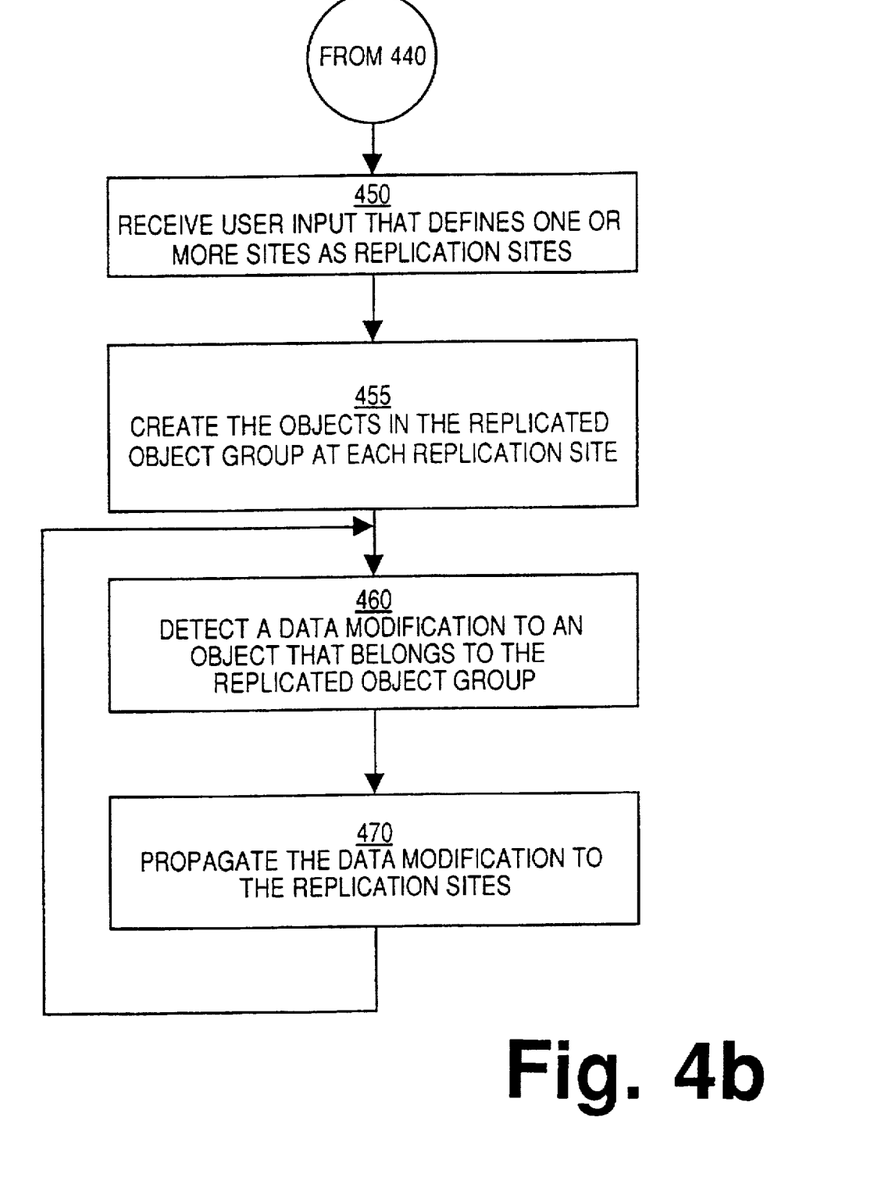

FIGS. 4a and 4b illustrate a flow diagram illustrating a method of specifying a replication environment and replicating data according to one embodiment of the present invention. The method begins at step 405 where one of a plurality of sites is designated as the master definition site for the replicated object group. The master definition site is the control point for performing administrative activities for the associated replicated object group, the replicated objects in the replicated object group, and the snapshot and master sites containing replicas of the replicated object group. The master definition site is defined via a procedure call that creates a replicated object group, step 410. The replicated object group represents a mapping to one or more subsets of data within one or more sets of formatted data stored at the master definition site. The site at which the replicated object group is created is designated as the master definition site for that replicated object group. Creating a replicated object group is accomplished by inserting a record corresponding to the new replicated object group into the object groups table 310.

Once the replicated object group has been created, at step 415, replicated objects can be added to the replicated object group. Importantly, adding a replicated object to a replicated object group need not involve physically moving the data associated with the replicated object. Rather, the data underlying the replicated object can simply be associated with the replicated object group to which it is added. Adding the replicated objects to the replicated object group registers the replicated objects and makes them eligible to be replicated to other sites. The registration is accomplished by adding a record to the replicated objects table 320. This record insertion can be performed by a procedure that is supplied with the new replicated object, for example. Usually the object to be replicated already exists at the master definition site; however, in one embodiment, the procedure that performs the registration also accepts one or more Structured Query Language (SQL) Data Definition Language (DDL) statements which create the replicated object as well.

In a replication configuration where one or more replication sites will propagate changes asynchronously, it is possible for conflicting updates to occur. For example, a conflict can be caused by two replication sites modifying the same replicated object before propagating their updates to each other. In one embodiment, if conflict resolution routines are desired they can be supplied via a procedure call, step 430. Many conflict resolution methods are available including: applying the data with the latest timestamp, applying all data additively, and applying the value from the replication site with the highest priority.

In another embodiment, replication support objects can be generated to support data replication, step 435. Replication support objects include database object such as triggers, packages and procedures. Step 435 further includes adding entries to the generated replication support objects table 340 for each of the generated objects.

The next step is to determine if more replicated objects are to be replicated with this replicated object group, step 440. If more replicated objects are to be added to the replicated object group, then steps 415 through 435 can be repeated until all the replicated objects that can be grouped together for replication have been added to the replicated object group. Otherwise, when the replicated object group has been completely defined and all the objects have been added, processing proceeds to step 450.

At step 450, user input is received that defines one or more sites as replication sites. This information will ultimately be written to the object groups table at the corresponding remote sites.

At step 455, the member replicated objects of the replicated object group are created at each remote replication site. The data associated with the replicated objects is replicated to each of the remote replication sites. At this point, the replication environment has been configured.

Once the replicated environment has been configured, the flow continues to step 460. At step 460, no action is taken until a data modification to a replicated object in the replicated object group is detected.

When a data modification is detected to one of the members of the replicated object group, processing proceeds to step 470. At step 470, any changes made to one of the replicated objects in the replicated object group are propagated to the replication sites. The changes are propagated to all master sites immediately or at a predetermined time-based interval. The master sites propagate the changes to associated snapshot sites at a predetermined time-based interval or on demand. Steps 460 and 470 are repeated for each data modification to a replicated object in the replicated object group.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system comprising a plurality of sites, a method of replicating data that is stored at a first site of said plurality of sites, said data belonging to one or more schemas, said method comprising the computer-implemented steps of:

creating a mapping between subsets of data within said one or more schemas and one or more object groups;

specifying one or more replication sites for each of said one or more object groups;

for each of said one or more object groups, creating at the one or more replication sites for said object group a replica of each subset of data that is mapped to said object group;

detecting at said first site a data modification to a particular subset of data within said one or more schemas; and if said particular subset of data has been mapped to an object group of said one or more object groups, then propagating said data modification to the one or more replication sites of said object group.

2. The method of claim 1 wherein:

said one or more schemas includes a first schema and a second schema; and the step of creating a mapping includes the steps of mapping said first subset of data to a first object group, said first subset of data residing in said first schema, and mapping a second subset of data to said first object group, said second subset of data residing in said second schema.

3. The method of claim 1 wherein said step of creating a mapping includes:

maintaining an object groups table, and maintaining a replicated objects table.

4. The method of claim 3 further comprising the steps of:

receiving a first input that identifies an object group;

adding an object group record to said object groups table, said object group record identifying said object group;

receiving a second input that identifies a subset of data; and adding a replicated object record to said replicated objects table, said replicated object record identifying said subset of data.

5. The method of claim 1 further comprising the step of generating one or more replication support objects for at least one of said one or more subsets of data.

6. The method of claim 5, wherein the step of generating one or more replication support objects includes generating a trigger.

7. The method of claim 1 further comprising the steps of:

designating a first replication site as a master site to receive propagated data modifications corresponding to replicas stored at said first replication site immediately upon detection of said data modifications or at predetermined time-based intervals; and designating a second replication site as a snapshot site to receive propagated data modifications corresponding to replicas stored at said second replication site, said propagated data modifications sent from said master site at predetermined time-based intervals or on demand.

8. A machine-readable medium that has stored thereon one or more sequences of instructions, the one or more sequences of instructions including instructions which, when executed by a processor, cause said processor to perform the steps of:

creating a mapping between subsets of data within said one or more schemas and one or more object groups;

specifying one or more replication sites for each of said one or more object groups;

for each of said one or more object groups, creating at the one or more replication sites for said object group a replica of each subset of data that is mapped to said object group;

detecting at said first site a data modification to a particular subset of data within said one or more schemas; and if said particular subset of data has been mapped to an object group of said one or more object groups, then propagating said data modification to the one or more replication sites of said object group.

9. The machine-readable medium of claim 8 wherein:

said one or more schemas includes a first schema and a second schema; and the step of creating a mapping includes:

the steps of mapping said first subset of data to a first object group, said first subset of data residing in said first schema, and mapping a second subset of data to said first object group, said second subset of data residing in said second schema.

10. The machine-readable medium of claim 9 wherein said step of creating a mapping includes:

maintaining an object groups table, and maintaining a replicated objects table.

11. The machine-readable medium of claim 10, further including sequences of instructions for:

receiving a first input that identifies an object group;

adding an object group record to said object groups table, said object group record identifying said object group;

receiving a second input that identifies a subset of data; and adding a replicated object record to said replicated objects table, said replicated object record identifying said subset of data.

12. The machine-readable medium of claim 8 further comprising the steps of:

designating a first replication site as a master site to receive propagated data modifications corresponding to replicas stored at said first replication site immediately upon detection of said data modifications; and designating a second replication site as a snapshot site to receive propagated data modifications corresponding to replicas stored at said second replication site, said propagated data modifications sent from said master site at predetermined time-based intervals.

13. The machine-readable medium of claim 8, further including sequences of instructions for generating one or more replication support objects for at least one of said one or more subsets of data.

14. The machine-readable medium of claim 13, wherein the step of generating one or more replication support objects includes generating a trigger.

15. A machine-readable medium that has stored thereon one or more sequences of instructions, the one or more sequences of instructions including instructions which, when executed by a processor, cause said processor to perform the steps of:

mapping a subset of data that resides in a particular schema to an object group;

mapping said object group to one or more sites of said plurality of sites; and creating replicas of said subset of data at each of said one or more sites.

16. The machine-readable medium of claim 15 further including instructions for performing the step of mapping at least two subsets of data to said object group, the first of said at least two subsets of data corresponding to a first schema and the second of said at least two subsets of data corresponding to a second schema.

17. In a computer system comprising a plurality of sites, a method of configuring an environment for providing data replication, said method comprising the computer-implemented steps of:

creating one or more replicated object groups at a first site;

maintaining a set of replicated object groups, said set of replicated object groups including said one or more replicated object groups;

maintaining a set of replicated objects for each of said one or more replicated object groups;

maintaining one or more groups of formatted data;

adding one or more replicated objects to said one or more replicated object groups to register said one or more replicated objects for replication, said one or more replicated objects corresponding to data from one or more schemas; and creating replicas of said one or more replicated objects at a second site.

18. The method of claim 17 further comprising the step of:

adding at least two replicated objects to one of said one or more replicated object groups, the first of said at least two replicated objects corresponding to a first schema and the second of said at least two replicated objects corresponding to a second schema.

19. The method of claim 17 further comprising the step of:

maintaining a set of generated objects for each of said one or more replicated objects, said generated objects for supporting data replication.

20. The method of claim 17 further comprising the step of:

maintaining a set of destinations to which each of said one or more replicated objects is replicated.

21. The method of claim 17 wherein:

said step of maintaining a set of replicated object groups includes maintaining an object groups table in a data dictionary; and said step of maintaining a set of replicated objects for each of said one or more replicated object groups includes maintaining a replicated objects table in said data dictionary.

* * * * *

(12) EX PARTE REEXAMINATION CERTIFICATE (5464th)
United States Patent
Sun et al.

(10) Number: US 5,799,306 C1
(45) Certificate Issued: Aug. 1, 2006

(54) METHOD AND APPARATUS FOR FACILITATING DATA REPLICATION USING OBJECT GROUPS

(75) Inventors: Harry Sun, Redwood City, CA (US); Benny Souder, Belmont, CA (US); Peter Lim, Redwood Shores, CA (US)

(73) Assignee: Oracle Corporation, Redwood Shores, CA (US)

Reexamination Request:
No. 90/006,650, May 27, 2003

Reexamination Certificate for:
Patent No.: 5,799,306
Issued: Aug. 25, 1998
Appl. No.: 08/667,677
Filed: Jun. 21, 1996

(51) Int. Cl.
*G06F 17/00* (2006.01)
*G06F 17/30* (2006.01)

(52) U.S. Cl. .................... 707/102; 707/10; 707/200
(58) Field of Classification Search .................. None
See application file for complete search history.

(56) References Cited

U.S. PATENT DOCUMENTS 5,991,771 A * 11/1999 Falls et al. .................. 707/202

OTHER PUBLICATIONS

60/001,261.*
Microsoft Corporation, "Microsoft® SQL Server, Administrator's Companion," Version 6.0, For the Microsoft® Windows NT™ Operating System, 1995, Table of Contents and Chapters 13–15, 170 pages.
1995 SQL Server History, at www.microsoft.com/sql/evaluation/anniversary/timeline.asp, Main.html, on Nov. 17, 2003.

* cited by examiner

*Primary Examiner*—Uyen Le (57) ABSTRACT

A method and apparatus for replicating data in a computer system having a plurality of sites is provided. Data stored at a first site is organized as one or more sets of formatted data. A mapping is created between subsets of data within the sets of formatted data and one or more object groups. These logical mappings to object groups allow distribution of the subsets of data at a finer level of granularity than previously provided and allow the subsets of data to potentially span multiple sets of formatted data. For each of the object groups, a replica of each subset of data that is mapped to the object group is created at one or more replication sites. When a data modification is detected to a subset of data that has been mapped to one of the one or more object groups, the data modification is propagated to the corresponding replication sites.

US 5,799,306 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 5, 7, 8, 9, 11, 12, 13, 15 and 17 are determined to be patentable as amended.

Claims 3, 6, 10, 14, 16, 18, 19, 20 and 21, dependent on an amended claim, are determined to be patentable.

New claims 22–34 are added and determined to be patentable.

1. In a computer system comprising a plurality of sites, a method of replicating data that is stored at a first site of said plurality of sites, said data belonging to one or more schemas, said method comprising the computer-implemented steps of:
   creating a mapping between subsets of data within said one or more schemas and one or more object groups;
   specifying one or more replication sites for each of said one or more object groups;
   for each of said one or more object groups, creating at the one or more replication sites for said *each* object group [a] *an updatable* replica of [each] *a* subset of data that is mapped to said *each* object group;
   detecting at said first site a data modification to a particular subset of data within said one or more schemas; [and]
   if said particular subset of data has been mapped to an object group of said one or more object groups, then propagating said data modification to the one or more replication sites of said object group;
   *wherein said particular subset of data includes a non-table object; and*
   *wherein said data modification is propagated to an updatable replica at the one or more replication sites.*

2. The method of claim [1] *1*, wherein:
   said one or more schemas includes a first schema and a second schema; and
   the step of creating a mapping includes the steps of
   mapping [said] *a* first subset of data to a first object group, said first subset of data residing in said first schema, and
   mapping a second subset of data to said first object group, said second subset of data residing in said second schema.

4. The method of claim 3 further comprising the steps of:
   receiving a first input that identifies [an] *a certain* object group;
   adding an object group record to said object groups table, said object group record identifying said *certain* object group;
   receiving a second input that identifies a *certain* subset of data; and
   adding a replicated object record to said replicated objects table, said replicated object record identifying said *certain* subset of data.

5. The method of claim 1 further comprising the step of generating one or more replication support objects for at least one of said [one or more] subsets of data.

7. The method of claim 1 further comprising the steps of:
   designating a first replication site as a master site to receive propagated data modifications corresponding to replicas stored at said first replication site [immediately upon detection of said data modifications or at predetermined time-based intervals]; and
   designating a second replication site as a snapshot site to receive propagated data modifications corresponding to replicas stored at said second replication site, said propagated data modifications sent from said master site [at predetermined time-based intervals or on demand].

8. A machine-readable medium that has stored thereon one or more sequences of instructions *for replicating data that is stored at a first site of a plurality of sites, said data belonging to one or more schemas*, the one or more sequences of instructions including instructions which, when executed by a processor, cause said processor to perform the steps of:
   creating a mapping between subsets of data within said one or more schemas and one or more object groups;
   specifying one or more replication sites for each of said one or more object groups;
   for each of said one or more object groups, creating at the one or more replication sites for said *each* object group [a] *an updatable* replica of [each] *a* subset of data that is mapped to said *each* object group;
   detecting at said first site a data modification to a particular subset of data within said one or more schemas; [and]
   if said particular subset of data has been mapped to an object group of said one or more object groups, then propagating said data modification to the one or more replication sites of said object group;
   *wherein said particular subset of data includes a non-table object; and*
   *wherein said data modification is propagated to an updatable replica at the one or more replication sites.*

9. The machine-readable medium of claim 8 wherein:
   said one or more schemas includes a first schema and a second schema; and
   the step of creating a mapping includes[:] the steps of
   mapping [said] *a* first subset of data to a first object group, said first subset of data residing in said first schema, and
   mapping a second subset of data to said first object group, said second subset of data residing in said second schema.

11. The machine-readable medium of claim 10, further including sequences of instructions for:
   receiving a first input that identifies [an] *a certain* object group;
   adding an object group record to said object groups table, said object group record identifying said *certain* object group;
   receiving a second input that identifies a *certain* subset of data; and adding a replicated object record to said replicated objects table, said replicated object record identifying said *certain* subset of data.

12. The machine-readable medium of claim 8 further comprising the steps of:

designating a first replication site as a master site to receive propagated data modifications corresponding to replicas stored at said first replication site [immediately upon detection of said data modifications]; and designating a second replication site as a snapshot site to receive propagated data modifications corresponding to replicas stored at said second replication site, said propagated data modifications sent from said master site [at predetermined time-based intervals].

13. The machine-readable medium of claim 8, further including sequences of instructions for generating one or more replication support objects for at least one of said [one or more] subsets of data.

15. A machine-readable medium that has stored thereon one or more sequences of instructions, the one or more sequences of instructions including instructions which, when executed by a processor, cause said processor to perform the steps of:

mapping a subset of data that resides in a particular schema to an object group;

mapping said object group to one or more sites of [said] *a plurality of* sites; [and]

creating *updatable* replicas of said subset of data at *each* of said one or more sites;

*wherein said subset of data includes at least one non-table database object;*

*detecting, at a first site of said one or more sites mapped to an object group, a modification to a replica of a subset of data mapped to said object group; and*

*propagating the detected modification to* each of said one or more sites *mapped to said object group.*

17. In a computer system comprising a plurality of sites, a method of configuring an environment for providing data replication, said method comprising the computer-implemented steps of:

creating one or more replicated object groups at a first site;

maintaining a set of replicated object groups, said set of replicated object groups including said one or more replicated object groups;

maintaining a set of replicated objects for each said one or more replicated object groups;

maintaining one or more groups of formatted data;

adding one or more replicated objects to said one or more replicated object groups to register said one or more replicated objects for replication, said one or more replicated objects corresponding to data from one or more schemas; [and]

creating *updatable* replicas of said one or more replicated objects at a second site[.]; *and*

*wherein said one or more replicated objects include at least one non-table database object.*

22. The method of claim 1 additionally comprising the steps of:

detecting at a first replication site a modification to a replica of a subset of data mapped to an object group of said one or more object groups; and propagating the detected modification to a second replication site.

23. *The method of claim 1, wherein said data modification is propagated from said one or more schemas on the first site directly to each of the one or more replicas on the one or more replication sites of said object group.*

24. The machine-readable medium of claim 8, additionally including sequences of instructions for:

detecting at a first replication site a modification to a replica of a subset of data mapped to an object group of said one or more object groups, and propagating the detected modification to a second replication site.

25. *The machine-readable medium of claim 8, wherein said data modification is propagated from said one or more schemas on the first site directly to each of the one or more replicas on the one or more replication sites of said object group.*

26. The method of claim 17, additionally including the step of:

detecting at the second site a modification to a replica of a replicated object, and propagating the detected modification to the replicated object at the first site.

27. *A machine-readable medium that has stored thereon one or more sequences of instructions for configuring an environment for providing data replication, the one or more sequences of instructions including instructions which, when executed by a processor, cause said processor to perform the steps of:*

*creating one or more replicated object groups at a first site;*

*maintaining a set of replicated object groups, said set of replicated object groups including said one or more replicated object groups;*

*maintaining a set of replicated objects for each of said one or more replicated object groups;*

*maintaining one or more groups of formatted data;*

*adding one or more replicated objects to said one or more replicated object groups to register said one or more replicated objects for replication, said one or more replicated objects corresponding to data from one or more schemas;*

*creating updatable replicas of said one or more replicated objects at a second site; and*

*wherein said one or more replicated objects include at least one non-table database object.*

28. *The machine-readable medium of claim 27, the steps further comprising:*

*adding at least two replicated objects to one of said one or more replicated object groups, the first of said at least two replicated objects corresponding to a first schema and the second of said at least two replicated objects corresponding to a second schema.*

29. *The machine-readable medium of claim 27, the steps further comprising:*

*maintaining a set of generated objects for each of said one or more replicated objects, said generated objects for supporting data replication.*

30. *The machine-readable medium of claim 27, the steps further comprising:*

*maintaining a set of destinations to which each of said one or more replicated objects is replicated.*

31. *The machine-readable medium of claim 27, the steps further comprising:* said step of maintaining a set of replicated object groups includes maintaining an object groups table in a data dictionary; and said step of maintaining a set of replicated objects for each of said one or more replicated object groups includes maintaining a replicated objects table in said data dictionary.

32. The machine-readable medium of claim 27, the steps further comprising:

detecting at the second site a modification to a replica of a replicated object, and propagating the detected modification to the replicated object at the first site.

33. *A computer-implemented method, comprising:*

*mapping a subset of data that resides in a particular schema to an object group;*

*mapping said object group to one or more sites of a plurality of sites;*

*creating updatable replicas of said subset of data at each of said one or more sites;*

*wherein said subset of data includes at least one non-table database object;*

*detecting, at a first site of said one or more sites mapped to an object group, a modification to a replica of a subset of data mapped to said object group; and*

*propagating the detected modification to each of said one or more sites mapped to said object group.*

34. *The method of claim 32, further including instructions for performing the step of mapping at least two subsets of data to said object group, the first of said at least two subsets of data corresponding to a first schema and the second of said at least two subsets of data corresponding to a second schema.*

\* \* \* \* \*